United States Patent [19]

Cameron et al.

[11] Patent Number: 5,232,751
[45] Date of Patent: * Aug. 3, 1993

[54] VINYL SHEET ARTICLE PRESENTING STRIATED COLOR PATTERNS AND METHOD OF MAKING THE SAME

[75] Inventors: Peter D. Cameron, Kansas City; Homer E. Galbraith, Ferrelview, both of Mo.

[73] Assignee: Variform, Inc., Kearney, Mo.

[ * ] Notice: The portion of the term of this patent subsequent to Oct. 1, 2008 has been disclaimed.

[21] Appl. No.: 712,552

[22] Filed: Jun. 10, 1991

Related U.S. Application Data

[63] Continuation of Ser. No. 430,571, Nov. 1, 1989, Pat. No. 5,053,176.

[51] Int. Cl.⁵ .............................................. B32B 31/30
[52] U.S. Cl. ........................................ 428/15; 264/75; 264/171; 264/245; 425/131.1; 425/132; 428/106; 428/221; 428/327; 428/332; 428/337
[58] Field of Search ............... 264/75, 245, 171, 177.1; 425/131.1, 133.5, 462, 132; 428/221, 327, 337, 106, 332, 15; 52/313

[56] References Cited

U.S. PATENT DOCUMENTS

| | | | |
|---|---|---|---|
| 2,233,987 | 3/1941 | Orsini | 264/245 |
| 2,798,258 | 7/1957 | Allan et al. | 264/75 |
| 2,803,041 | 8/1957 | Hill et al. | 425/132 |
| 3,388,196 | 6/1968 | Farrell | 264/75 |
| 3,405,425 | 10/1968 | Buckley et al. | 264/171 |
| 3,608,013 | 9/1971 | Ingham | 264/245 |
| 3,769,380 | 10/1973 | Wiley | 264/75 |
| 3,966,857 | 6/1976 | Charlton et al. | 264/75 |
| 3,969,053 | 7/1976 | Baconnier et al. | 425/132 |
| 4,072,791 | 2/1978 | Randall | 428/221 |
| 5,053,176 | 10/1991 | Cameron et al. | 264/75 |

Primary Examiner—Jeffery Thurlow
Attorney, Agent, or Firm—Hovey, Williams, Timmons & Collins

[57] ABSTRACT

A method and apparatus (10) is provided for producing vinyl siding (76) having aesthetically pleasing, wood-like striations embedded therein. Apparatus (10) includes processing structure (12) for processing topcoat compound and substrate compound extruders (18, 20) respectively. Acrylic colorant is discharged from feeders (64, 66) into barrel (34) via adapter (72) and thereby mixed with the topcoat compound. The interval of discharge is four seconds every twenty seconds. Adapter (72) utilizes a water jacket to keep colorant cool prior to its introduction into barrel (34) where it experiences a temperature sufficient for melting, usually about 380° F. Due to the interval of discharge and the twenty second period thereof, striations (82) are uniform and continuous in nature so as to simulate wood grain.

5 Claims, 1 Drawing Sheet

VINYL SHEET ARTICLE PRESENTING STRIATED COLOR PATTERNS AND METHOD OF MAKING THE SAME

This is a of co-pending application Ser. No. 07/430,571 filed on Nov. 1, 1989, now U.S. Pat. No. 5,053,176 issued Oct. 01, 1991.

BACKGROUND OF THE INVENTION

1. Field of the Invention

This invention relates to vinyl siding for the exteriors of buildings. More particularly, it is concerned with a vinyl siding presenting random, continuous striations for simulating a natural wood-grain appearance.

2. Description of the Prior Art

Vinyl siding for building exteriors has gained increasing market acceptance due to its weatherability and economy. One impediment to such acceptance however, is the "artificial" appearance of such siding, particularly in darker hues. Accordingly, there is a need for a vinyl siding product which has a natural wood-like appearance, especially for darker siding. Heretofore no such product has been developed.

A number of inventions pertaining to vinyl siding and the like have been proposed. Patents illustrating these types of inventions include: U.S. Pat. Nos. 3,329,927, 3,621,539, 4,352,771, 4,400,919, 4,549,378, 4,843,793.

SUMMARY OF THE INVENTION

The problems outlined above are in large measure solved by the apparatus and method in accordance with the present invention. That is to say, the apparatus and method hereof enable the production of vinyl siding presenting continuous, random striations having an aesthetically pleasing wood-grain appearance. The inventive apparatus provides processing structure for processing a topcoat compound, colorant and a substrate compound, with color feeder structure linked to the processing structure so that the colorant may be selectively mixed with the compound within the processing structure A cooling device, including an adapter having a water jacket, is coupled between the processing structure and the color feeder structure to keep the colorant cool and solid prior to mixing As the colorant is mixed with the compound, which is in a heated, thermoplastic state, it is processed downstream so that the melted colorant spreads axially in the direction of extrusion within the compound to achieve the above-mentioned striative effect The color-striated compound is then fused with the substrate compound and expressed through a die member and is then embossed, formed and cooled so that the final product may be cut therefrom.

The present invention also includes a method of manufacturing a synthetic resin article presenting a controlled color pattern of randomly presented striations. This method includes providing respective quantities of a synthetic resin compound and a synthetic resin colorant and introducing the synthetic resin compound into an extruder. The synthetic resin colorant is maintained at a temperature level substantially below its melting point prior to mixing with the compound in the extruder. The colorant is intermittently discharged into the extruder in predetermined proportions, so that the colorant is mixed with the compound in the extruder and melted to produce random striations in the resulting product.

In preferred forms, the colorant is added for four seconds at twenty second intervals. In particularly preferred forms, the compound is heated to about 380° F. for mixing with the colorant.

DESCRIPTION OF THE PREFERRED EMBODIMENT

Figure 1:
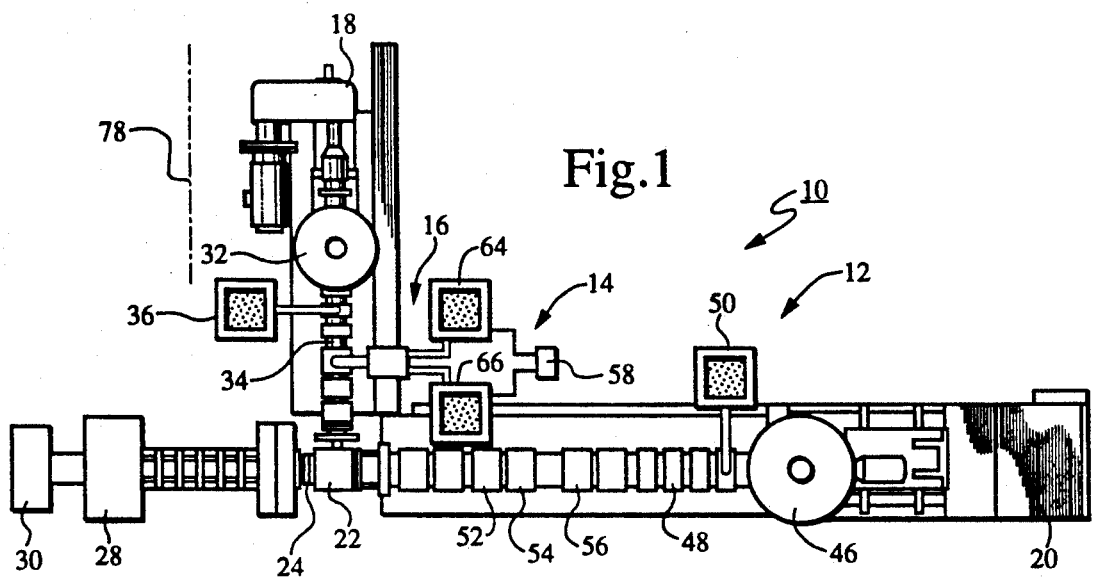
FIG. 1 is a schematic, plan view of the preferred apparatus in accordance with the present invention.

Referring now to the drawing in general, and FIG. 1 in particular, an apparatus 10, for manufacturing a vinyl sheet having controlled color patterns with a wood-grain appearance, broadly includes processing structure 12, color feeder structure 14 and a cooling device 16. Color feeder structure 14 serves as a station for discharging acrylic colorants through cooling device 16 into processing structure 12 where the colorant is mixed with a synthetic resin topcoat compound in a thermoplastic state. The colored topcoat compound is then fused with a substrate compound within other portions of the processing structure and the web-like product is subsequently formed.

In more detail, processing structure 12 includes a power source (not shown), twin-screw extruders 18,20, of a conventional type for extruding synthetic resin materials, as well as coextruder block. member 22, die member 24, water bath member (not shown), embossing station 28 and forming station 30. Other components may be added to apparatus 10 for performing various additional processes which enhance the final product but are old in the art and thus not pertinent to the description of the present invention.

Extruder 18 includes a material inlet 32, barrel 34, and a volumetric upstream color feeder 36, inlet 32 and feeder 36 being in fluid communication with barrel 34. Barrel 34 is segmented into a plurality of zones as at 38-42 (see FIG. 2), each of the zones containing an integral, exterior heat member capable of achieving temperature levels in excess of 425° F. within the interior of barrel 34. Barrel 34 contains twin screws (not shown) which are appropriately fluted for processing material in a downstream fashion (i.e. from the top to the bottom of extruder 18 as viewed in FIG. 1). Barrel 34 also includes a vent port 44 (see FIG. 2) bifurcated to form two conduits, with each of the conduits being in fluid communication with one of the respective screws of barrel 34. Vent port 44 is normally used for removal of volatiles during the extrusion process, but in the novel method hereof vent port 44 is used for an entirely different function, to be described in detail below.

Extruder 20 correspondingly includes a material inlet 46, barrel 48, and an upstream volumetric color feeder 50, inlet 46 and feeder 50 both in fluid communication with barrel 48. Barrel 48 is partitioned into a plurality of zones as at 52-56, each of the zones containing an integral, exterior heat member capable of achieving temperature levels in excess of 425° F. within the interior of barrel 34. Barrel 48 contains twin screws (not shown) which are appropriately fluted for processing material in a downstream fashion.

Figure 2:
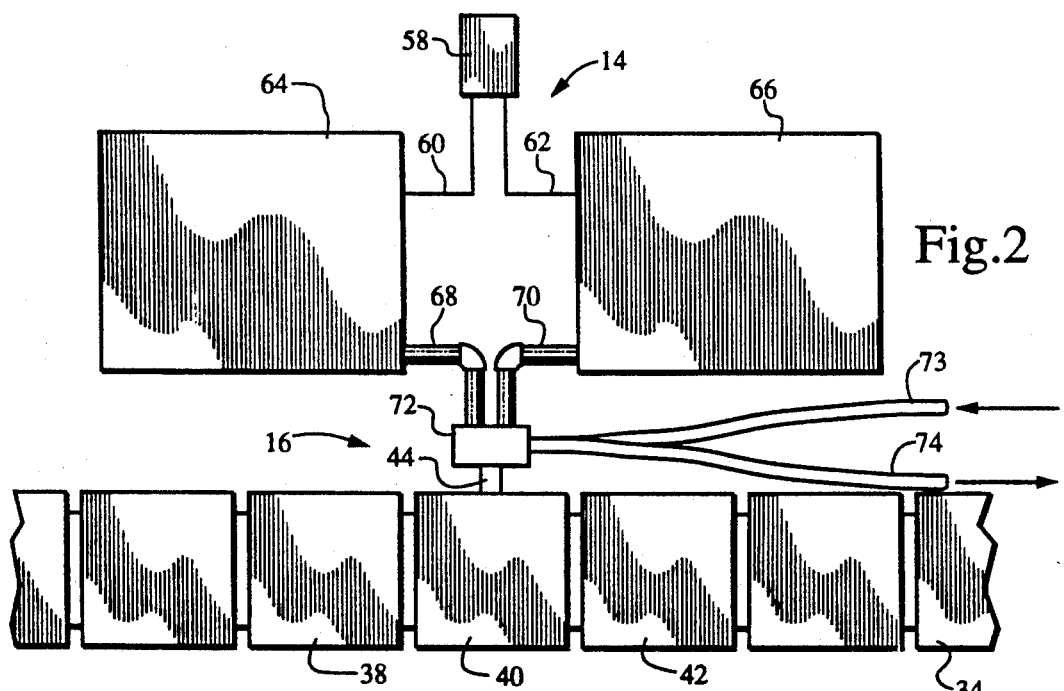
FIG. 2 is a schematic, side elevational view of the color feeder structure, cooling device and portions of the processing structure.

Referring to FIG. 2, color feeder structure 14 includes timer 58, electronic lines 60,62, volumetric color feeders 64,66, and coupling sleeves 68,70, in fluid communication therewith, as shown. Color feeders 64,66 are of conventional design well known in the art and are in fluid communication with respective conduits of vent port 44, via sleeves 68,70, and cooling device 16.

Cooling device 16 includes vent-port adapter 72 having an exterior water jacket in fluid communication with water inlet 73 and with water outlet 74 which are connected respectively to a water source (not shown) and a drain (not shown). The water jacket, when supplied with relatively cold water (e.g. tap water from the cold tap) provides a cooling reservoir which is segregated from interior portions of adapter 72 so that colorant may pass from sleeves 68,70 through adapter 72 and into respective conduits of vent port 44 in a relatively cold (e.g. ambient temperature) environment.

In operation, a polyvinyl chloride topcoat compound is constantly introduced into extruder 18 in powder form via inlet 32 while a similar polyvinyl chloride substrate compound is constantly introduced into extruder 20 in powder form via inlet 46. Both compounds have stabilizers added thereto, the difference being that a greater quantity of high performance weatherable additives is added to the topcoat compound so that the topcoat layer of the finished product is more durable than the substrate layer when exposed to the elements. Less of the high performance additives are added to the substrate compound for obvious economic reasons. The temperature within extruders 18,20 is generally about 380° F. although some zone-to-zone temperature variations occur, as are well known in the art. In particular, at block member 22 the temperature is closer to about 340° F.

The predetermined, relative proportions of topcoat compound to substrate compound added to respective extruders 18,20 are designed to achieve a final product which has a total thickness of about 42 mils. Experience demonstates that for optimum weatherability the topcoat layer should be about 30% of the total thickness with the substrate layer providing the other 70%. Accordingly, in the preferred embodiment, the topcoat layer of the finished product has a thickness of about 12.6 mils and the substrate layer has a thickness of about 29.4 mils. The respective compounds are extruded downstream in the normal fashion.

Each of the respective compounds, in a thermoplastic condition, is colored, such as a dark beige color, by the addition of respective portions of a cryogenically ground color concentrate at upstream feeders 36,50.

Referring now to FIG. 2, as the topcoat compound is processed downstream, volumetric feeders 64,66 periodically discharge acrylic colorant into respective screws of barrel 30 via sleeves, 68,70, adapter 72 and the conduits of bifurcated vent port 44. In the preferred practice, methyl methacrylate is the base for the colorant which also has one of a number of inorganic pigments added to the base material to achieve the desired color. These colors, for example, may be obtained from any number of color concentrate suppliers under such names as charcoal gray, dark brown, red brown, dark blue, dark clay, and dark tan.

Table I, located at the end of the Description of the Preferred Embodiment, sets forth the parts per hundred and corresponding pounds per hour of colorant added when extruder 18 is delivering about 250 pounds of colored topcoat compound per hour to block member 22. For example, for every 250 pounds of colored compound delivered to block member 22, about 48.8 pounds of charcoal gray colorant must be added at feeders 64,66.

Timer 58 is appropriately programmed to send an actuating "on" electronic signal to feeders 64,66 every twenty seconds. The "on" signal lasts for four seconds so that colorant is discharged from feeder 64,66 into zone 40 for four seconds with a subsequent sixteen second "off" period before the next coloring cycle begins.

As noted above, the vent port 44 is normally used to remove undesirable volatile compounds from the processed material by applying negative pressure at both screws via the conduits of vent port 44. It is understood in the industry that without such a removal process undesirable effects such as blistering occur in the final product. Due to the novel use of vent port 44 in the present invention, it is clear that no such removal of volatiles occurs in the inventive process, yet no negative side effects such as blistering have been observed despite the absence of a device for removing the volatiles. Thus, surprisingly, the method and apparatus 10 described herein produce a product exhibiting no blistering or the like without using a vent port for the removal of volatiles.

Figure 3:
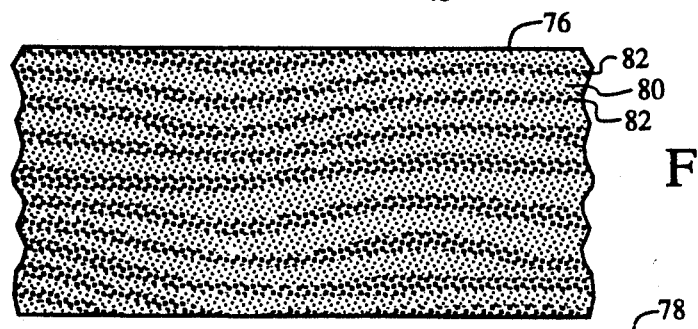
FIG. 3 is a partial, side elevational view of the finished product of the present invention.

Referring to FIG. 3, a portion of a finished. web of siding 76 is shown. The axis of extrusion for extruder 18 is shown at 78 (also see FIG. 1 where axis 78 is displayed parallel to extruder 18 for ease of illustration). The dappling effect as at 80, between substantially parallel, axially-aligned striations 82, is also due to the colorant. The discharge of colorant into the topcoat compound as it is processed in both screws of barrel 34 results in a set of randomly uniform, continuous striations integrally embedded in the topcoat layer of the final product as shown. The striations are referred to as random because of the wavy, curvilinear appearance. Yet the striations are also referred to as being uniform because there is sufficient uniformity to the substantially parallel striations, evenly distributed from top to bottom in the final product, so as to give an aesthetically pleasing, wood-grain appearance. The striations are referred to as continuous because the striations are continuous in an axial direction. That is to say, in a web, of for example, 40 feet the product would exhibit continuous striations, parallel to the axis of extrusion. The key to this continuity phenomenon is related to the periodic nature of the discharge of colorant. The optimum discharge period is found to be twenty seconds with an actual discharge interval of four seconds therein. If colorant is discharged for substantially more than four seconds (in a period of twenty seconds), the striations become overlapping and overly heavy so as to destroy the aesthetic appearance, while if colorant is discharged for substantially less than four seconds (in a period of twenty seconds), the striations tend to be noncontinuous blotches in the topcoat layer of the finished product. Thus, the period of twenty seconds and the four second discharge interval are both important.

The striated topcoat compound is processed into block member 22 where it is fused with substrate compound. The fused material is pressed or expressed out of die 24. An embossing pattern is placed on the topcoat layer at embossing station 28 and the product is then formed in its final shape at forming station 40. In preferred embodiment, the final product is produced in accordance with the standards of the ASTM specification document D 3679-86, which is incorporated by reference herein.

TABLE I

| Acrylic | Parts per hundred | lbs. per hour |
| --- | --- | --- |
| charcoal gray | 19.5 | 48.8 |
| dark brown | 12.7 | 31.7 |
| red brown | 14.8 | 37.0 |
| dark blue | 18.2 | 45.5 |
| dark clay | 17.4 | 43.5 |
| dark tan | 15.3 | 38.3 |

We claim:

1. A method for making a synthetic resin article presenting a controlled color pattern of random striations, the method including the steps of:
   (a) providing respective quantities of a synthetic resin compound and a synthetic resin colorant;
   (b) introducing said quantity of compound into an extruder;
   (c) maintaining said quantity of colorant at a temperature level substantially below its melting point prior to mixing thereof with said compound;
   (d) intermittently discharging predetermined proportions of said colorant into said extruder; and
   (e) mixing said quantity of compound and said proportions of said colorant in said extruder and elevating the temperature of the colorant to melt the colorant therein so that random striations appear throughout the length of the synthetic resin article.

2. The method of claim 1, wherein said synthetic resin compound is provided of a first synthetic resin material and said synthetic resin colorant is provided of a second synthetic resin material.

3. The method of claim 2, wherein said first synthetic resin material is polyvinyl chloride and said second synthetic resin material has a methyl methacrylate base.

4. A vinyl siding product presenting a simulated wood gain appearance and having a random color pattern of striations presenting a wavy appearance produced by the process of providing respective quantities of a synthetic resin topcoat compound and a synthetic resin colorant and heating said quantity of topcoat compound to a temperature level sufficient to induce a thermoplastic state therein, maintaining said quantity of colorant at a temperature level substantially below its melting point prior to mixing with said topcoat compound, introducing said quantity of colorant into said synthetic resin topcoat compound in a thermoplastic state with said colorant in a substantially unmelted state, and melting said colorant by mixing it in predetermined proportions with said thermoplastic topcoat compound while said topcoat compound is moving, and fusing the colored topcoat compound over a substrate compound to yield a vinyl siding product presenting a topcoat layer having integrally embedded striations appearing randomly throughout the topcoat layer thereof and a substrate layer separate from said topcoat layer.

5. A vinyl siding product presenting a simulated wood grain appearance and having a random color pattern of striations presenting a wavy appearance produced by the process of providing respective quantities of a synthetic resin topcoat compound and a synthetic resin colorant, introducing said quantity of topcoat compound into an extruder, maintaining said quantity of colorant at a temperature level substantially below its melting point prior to mixing thereof with said compound, intermittently discharging predetermined proportions of said colorant into said extruder, mixing said quantity of topcoat compound and said proportions of colorant in said extruder, and fusing said topcoat compound over a substrate compound to yield a vinyl siding product presenting a topcoat layer having integrally embedded striations appearing randomly throughout the length thereof and a substrate layer separate from said topcoat layer.

* * * * *